(12) United States Patent
Calloway

(10) Patent No.: US 12,397,719 B1
(45) Date of Patent: Aug. 26, 2025

(54) FEEDBOX CARRIER

(71) Applicant: Riley J. Calloway, Clarksville, TX (US)

(72) Inventor: Riley J. Calloway, Clarksville, TX (US)

( * ) Notice: Subject to any disclaimer, the term of this patent is extended or adjusted under 35 U.S.C. 154(b) by 116 days.

(21) Appl. No.: 17/741,313

(22) Filed: May 10, 2022

Related U.S. Application Data

(60) Provisional application No. 63/186,360, filed on May 10, 2021.

(51) Int. Cl.
*B60R 9/06* (2006.01)
*A01K 5/00* (2006.01)

(52) U.S. Cl.
CPC . *B60R 9/06* (2013.01); *A01K 5/00* (2013.01)

(58) Field of Classification Search
CPC .................................. B60R 9/06; A01K 5/00
USPC ....................................................... 224/410
See application file for complete search history.

(56) References Cited

U.S. PATENT DOCUMENTS

| | | | | |
|---|---|---|---|---|
| 2,425,892 A * | 8/1947 | Michaels | ............. | B62D 49/065 414/466 |
| 4,042,141 A * | 8/1977 | Schweigert | ........... | E02F 3/3417 414/703 |
| 4,114,770 A * | 9/1978 | Jordan | ..................... | A24B 3/00 294/67.1 |
| 4,214,776 A * | 7/1980 | Nurse | .................... | B62D 49/02 280/416.2 |
| 6,698,527 B1 * | 3/2004 | White | ...................... | B60D 1/07 172/450 |
| 7,322,586 B1 * | 1/2008 | Zettel | ........................ | B62B 1/18 414/490 |
| 10,857,846 B1 * | 12/2020 | Jacobs | ..................... | B60D 1/06 |
| 11,034,372 B1 * | 6/2021 | Jordan | .................. | B62B 5/0003 |
| 2009/0205847 A1 * | 8/2009 | Benoit | ..................... | B60R 9/06 172/249 |
| 2011/0206488 A1 * | 8/2011 | Windsor | ................. | B66C 23/44 254/362 |
| 2012/0187658 A1 * | 7/2012 | Wheeler | ............... | B60D 1/665 280/415.1 |
| 2021/0016722 A1 * | 1/2021 | Tressel | ................. | A01D 75/006 |
| 2022/0053683 A1 * | 2/2022 | Bucknell | ............... | B60D 1/141 |

* cited by examiner

*Primary Examiner* — Peter N Helvey
(74) *Attorney, Agent, or Firm* — Kenneth L. Tolar

(57) ABSTRACT

A feedbox carrier includes a base frame formed of a pair of parallel side rails with front and rear rails perpendicularly disposed therebetween. Downwardly extending from the front rail are a pair of spaced flanges for coupling with the two lower lifting arms of a three-point tractor hitch. A pair of upstanding flaps are positioned between the flanges for coupling with the upper center arm of the hitch. A cover sheet superimposable on the base frame provides a stable support surface for the feedbox. Accordingly, a feedbox is positioned on the sheet and the frame is secured to a three-point hitch to allow a tractor to easily lift and transport the feedbox to and from a feeding location.

5 Claims, 4 Drawing Sheets

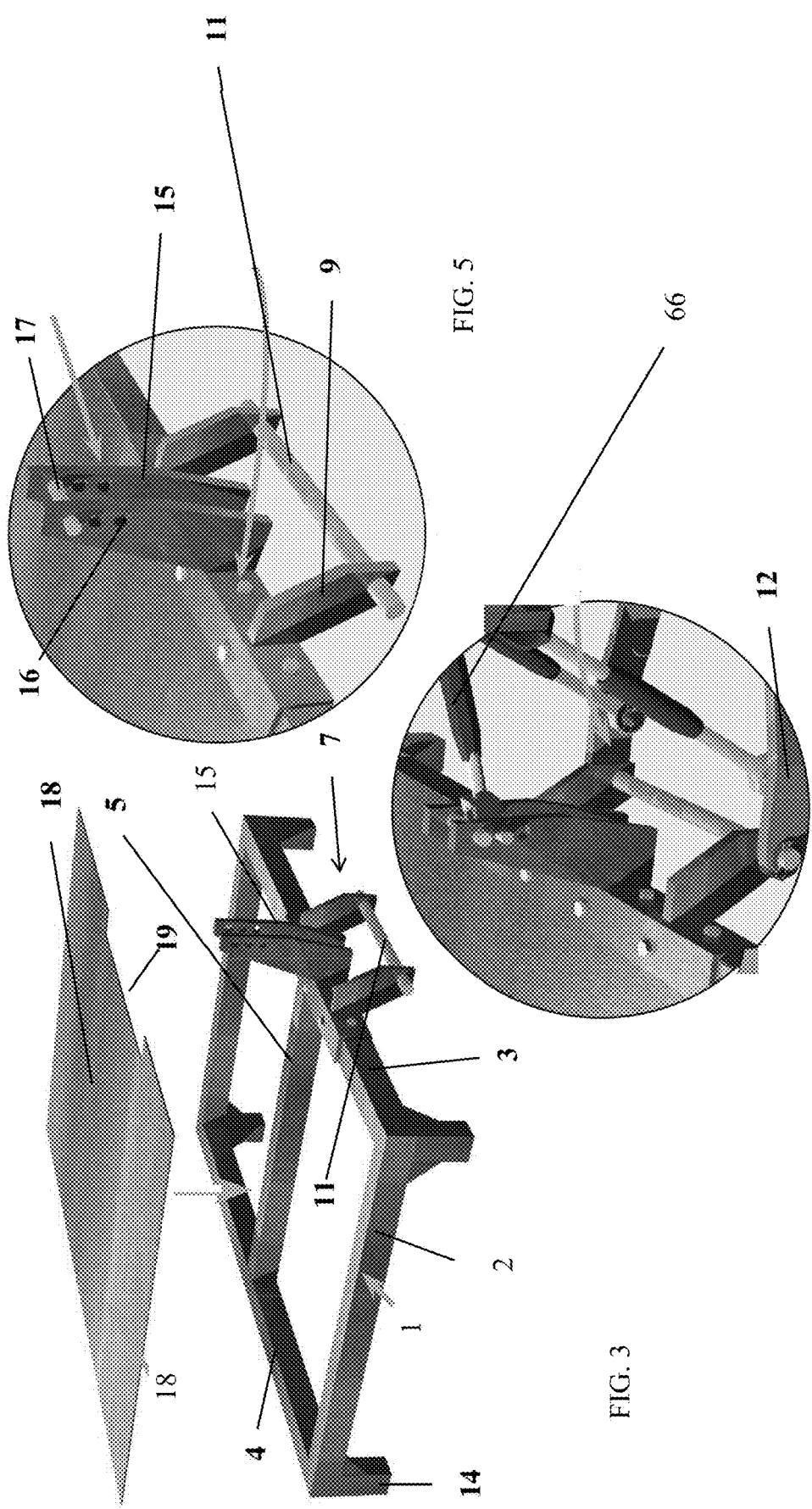

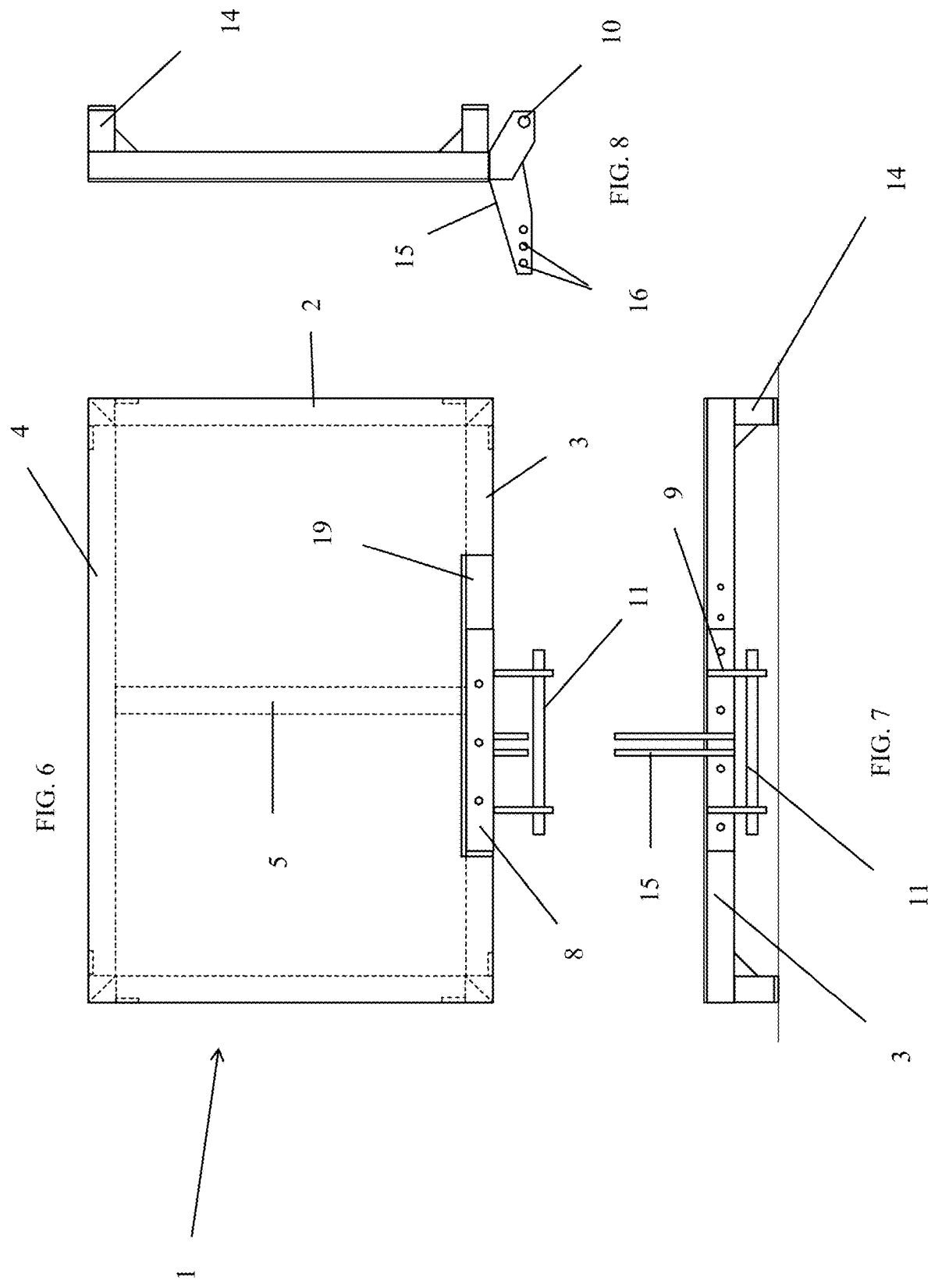

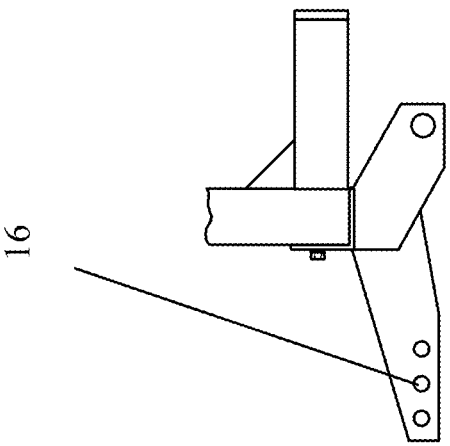
FIG. 11
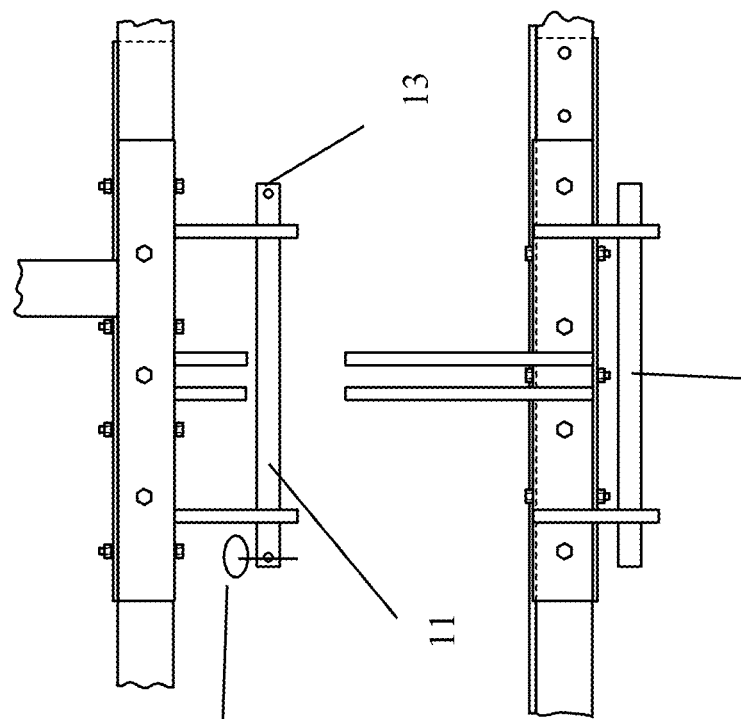
FIG. 9
FIG. 10

FEEDBOX CARRIER

CROSS REFERENCE TO RELATED APPLICATIONS

This application claims priority of provisional application No. 63/186,360 filed on May 10, 2021, the specification of which is incorporated herein by reference.

BACKGROUND OF THE INVENTION

The present invention relates to a uniquely designed carrier that is securable to a three-point tractor hitch to more easily transport a feedbox to a feeding location.

DESCRIPTION OF THE PRIOR ART

Typically, a feedbox is mounted on a vehicle trailer or a truck bed and driven to a feeding location. However, during inclement weather, a vehicle often bogs down in muddy areas, preventing the feedbox from being transported to the desired destination. Delayed or missed feed times can severely affect the health of cattle and other farm animals. Furthermore, because a feed hopper weighs as much as a ton, it places considerable strain on a vehicle, resulting in premature failure and costly repairs. Additionally, anxious cattle often break sideview mirrors and dent the vehicle exterior in their eagerness to access the feed.

Accordingly, there is currently a need for a more reliable and less destructive means of transporting a feedbox to a feeding location. The present invention addresses this need by providing a uniquely designed carrier that is securable to a three-point hitch to allow a tractor to easily transport the feedbox to the feeding location.

SUMMARY OF THE INVENTION

The present invention relates to a feedbox carrier comprising a base frame formed of a pair of parallel side rails with front and rear rails perpendicularly disposed therebetween. Downwardly extending from the front rail are a pair of spaced flanges, each having an aperture at a lower end. An elongated rod is received within the apertures for coupling with the two lower lifting arms of a three-point tractor hitch. A pair of upstanding flaps positioned between the flanges include a series of holes that removably receive a post that connects to the upper center arm of the hitch. A cover sheet superimposable on the base frame provides a stable support surface for the feedbox. Accordingly, a feedbox is positioned on the cover sheet and the frame is secured to the upper and lower arms of a three-point tractor hitch. The tractor can then easily lift and transport the feedbox to and from a feeding location regardless of soil conditions.

It is therefore an object of the present invention to provide a carrier that allows a user to more easily transport a feedbox.

It is therefore another object of the present invention to provide a feedbox carrier that is adapted to quickly couple with a three-point trailer hitch.

It is therefore yet another object of the present invention to provide a feedbox carrier that can be easily transported by a tractor.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a perspective, exploded view of the carrier.
FIG. 4 is a detailed view of a three-point tractor hitch secured to the carrier.
FIG. 5 is a closeup, detailed view of the carrier fastening hardware.
FIG. 6 is a top, plan view of the carrier.
FIG. 7 is a front-end view of the carrier.
FIG. 8 is a side view of the carrier.
FIG. 9 is an isolated top view of the bracket and upstanding flaps.
FIG. 10 is an isolated front view of the bracket and upstanding flaps.
FIG. 11 is a sectional side view of the bracket and upstanding flaps.

DESCRIPTION OF THE PREFERRED EMBODIMENT

Figure 1:
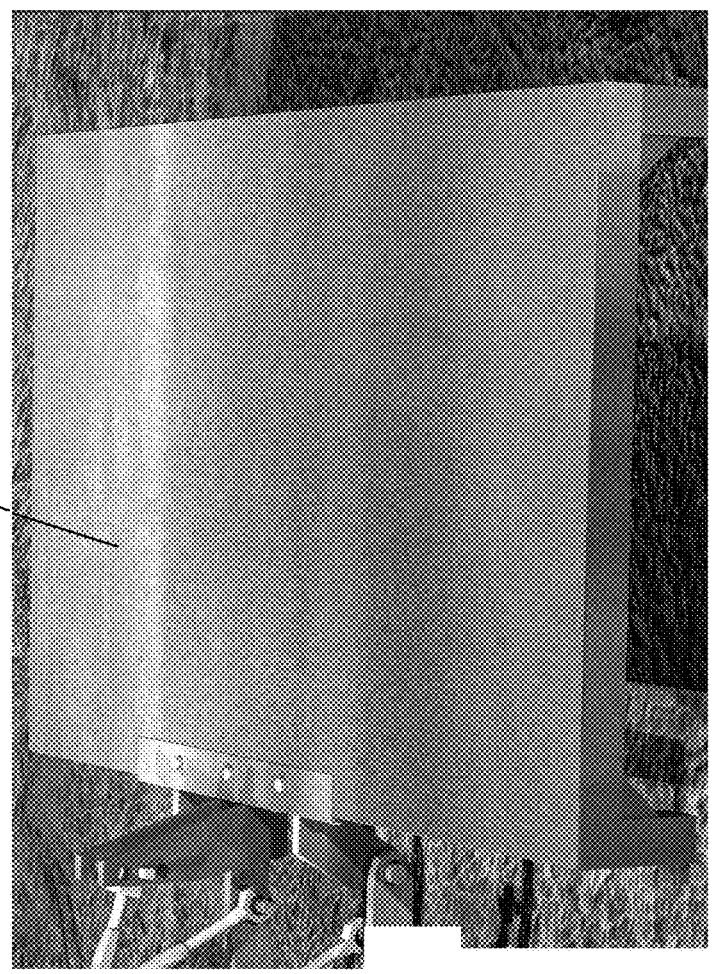
FIG. 1 depicts the carrier according to the present invention secured to a tractor.
Figure 2:
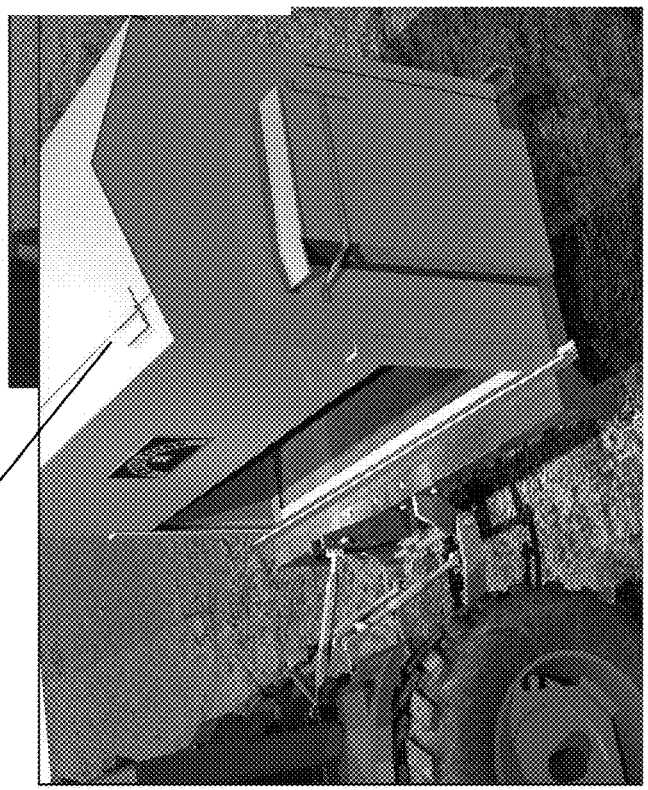
FIG. 2 is a top, perspective view of the carrier.

The present invention relates to a feedbox carrier comprising a base frame 1 formed of a pair of parallel side rails 2 with front 3 and rear rails 4 perpendicularly disposed therebetween. Extending from the front rail to the rear rail is a reinforcement strut 5 for structurally enhancing the frame to withstand the weight of a conventional one-ton feedbox 6. A bracket 7 includes an L-shaped bar 8 that is fastened to the front rail with bolts, each having a minimum tensile strength of 150,000 pounds. Downwardly extending from the bar are a pair of spaced flanges 9 each having an aperture 10 at a lower end. An elongated rod 11 is received within the apertures for coupling with the two lower lifting arms 12 of a three-point tractor hitch. An opening 13 at each end of the rod receives a locking pin 55 to secure the lifting arms to the bracket.

A pair of upstanding flaps 15 are attached to the bar and positioned between the flanges 9. The flaps 15 include a series of holes 16 that removably receive a post 17 for coupling with the upper center arm 66 of the hitch. The multiple holes allow the post 17 to be repositioned according to the size or angle of the upper hitch arm 66.

The base frame includes a plurality of elevating support legs 14 that facilitate access to the rod 11, the post 17 and the locking pins 55. The legs 14 can be removably coupled with the frame so as not to obstruct travel to and from the feeding location.

A cover sheet 18 superimposable on the base frame provides a stable support surface for the feedbox. A notch 19 on the rear edge of the sheet accommodates the bracket bar 8 and allows the feedbox to be moved laterally to align with the tractor rear tire.

Accordingly, a feedbox is positioned on the sheet, and the frame is secured to the upper and lower arms of a three-point tractor hitch. The tractor can then easily lift and transport the feedbox to and from a feeding location regardless of soil conditions. Moreover, the tractor includes no external hardware that can be damaged by overzealous cattle.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a tractor having a three-point hitch on a rear end, said three-point hitch including a pair of lower lifting arms and an upper center arm, a feedbox carrier comprising:
    a base frame having a front rail, a rear rail, and a pair of side rails extending therebetween;
    a cover sheet superimposed on said base frame for supporting a feedbox;
    a pair of spaced flanges downwardly extending from the front rail of said base frame, each of said pair of spaced flanges having an aperture at a lower end;
    an elongated rod received within the aperture and an opening on each of the two lower lifting arms of said three-point hitch, whereby when a feedbox is positioned on said sheet, the tractor easily lifts and transports the feedbox to and from a feeding location regardless of soil conditions;
    a pair of upstanding flaps on said front rail and positioned between said flanges; wherein said pair of spaced flanges and said pair of upstanding flaps are attached to an L-shaped bar fastened to the front rail of said frame;
    a series of holes on said flaps that removably receive a post that is securable to the upper center arm of said hitch for further securing said base frame to said three-point hitch;
    a notch on a rear edge of said sheet that accommodates said L-shaped bar and allows the sheet and the feedbox to be moved laterally to align with a tractor rear tire.

2. The combination according to claim 1 further comprising:
    an opening at each end of the elongated rod that receives a locking pin to secure the lifting arms thereto.

3. The combination according to claim 2 further comprising a plurality of elevating support legs removably attached to said base frame that facilitate access to said elongated rod, said post and said locking pin while not obstructing travel to and from a feeding location when removed.

4. The combination according to claim 1 wherein said L-shaped bar is fastened with bolts each having a minimum tensile strength of 150,000 pounds.

5. The combination according to claim 1 further comprising a reinforcement strut extending from the front rail to the rear rail of said base frame for structurally enhancing the base frame to withstand a weight of the feedbox.

* * * * *